United States Patent [19]
Kanazawa et al.

[11] Patent Number: 6,010,673
[45] Date of Patent: *Jan. 4, 2000

[54] METHOD FOR PURIFYING EXHAUST GAS

[75] Inventors: Takaaki Kanazawa, Tokyo; Shinichi Matsumoto, Aichi-gun; Satoshi Iguchi, Mishima; Kenji Katoh, Sunto-gun; Toshiaki Tanaka, Numazu; Shinichi Takeshima, Susono; Tsuneyuki Tanizawa, Toyota; Koichi Kasahara; Syuji Tateishi, both of Ogasa-gun; Hideaki Muraki, Nagoya, all of Japan

[73] Assignees: Toyota Jidosha Kabushiki Kaisha, Toyota; Cataler Industrial Co., Ltd., Shizuoka, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/608,948

[22] Filed: Feb. 29, 1996

Related U.S. Application Data

[63] Continuation of application No. 08/309,483, Sep. 21, 1994, abandoned, which is a continuation-in-part of application No. 08/118,327, Sep. 9, 1993, abandoned.

[30] Foreign Application Priority Data

Sep. 21, 1992 [JP] Japan ..................................... 4-251360
Dec. 29, 1992 [JP] Japan ..................................... 4-361468

[51] Int. Cl.$^7$ .................................................. B01D 53/94
[52] U.S. Cl. .................................... 423/213.5; 423/239.1; 423/244.02
[58] Field of Search ............................ 423/213.5, 213.2, 423/239.1, 244.02

[56] References Cited

U.S. PATENT DOCUMENTS

| | | | |
|---|---|---|---|
| 3,919,120 | 11/1975 | Kato et al. | 252/466 B |
| 3,931,050 | 1/1976 | Asano et al. | 252/462 |
| 4,128,503 | 12/1978 | Yamauchi et al. | 252/435 |
| 4,497,783 | 2/1985 | Barber | 423/213.5 |
| 4,621,071 | 11/1986 | Blanchard et al. | 502/302 |
| 4,682,577 | 7/1987 | Kato et al. | 123/492 |
| 5,075,274 | 12/1991 | Kiyohide et al. | 502/303 |
| 5,075,275 | 12/1991 | Murakami et al. | 502/303 |
| 5,116,800 | 5/1992 | Williamson et al. | 502/303 |
| 5,179,059 | 1/1993 | Domesle et al. | 502/303 |
| 5,185,305 | 2/1993 | Subramanian et al. | 423/213.5 |
| 5,208,198 | 5/1993 | Nakano et al. | 502/74 |
| 5,208,205 | 5/1993 | Subramanian et al. | 423/213.5 |
| 5,294,421 | 3/1994 | Muraki et al. | 423/239.1 |
| 5,388,406 | 2/1995 | Takeshima et al. | 60/297 |

FOREIGN PATENT DOCUMENTS

| | | |
|---|---|---|
| 0210681 | 2/1987 | European Pat. Off. . |
| 257 983 | 3/1988 | European Pat. Off. . |
| 439010 | 7/1991 | European Pat. Off. . |
| 0540280 | 5/1993 | European Pat. Off. . |
| 0573672 | 12/1993 | European Pat. Off. . |
| 0580389 | 1/1994 | European Pat. Off. . |
| 2168502 | 8/1973 | France . |
| 4008371 | 9/1990 | Germany . |
| 4319294 | 5/1994 | Germany . |
| 61-111127 | 5/1986 | Japan . |
| 62-117620 | 5/1987 | Japan . |
| 6-304476 | 11/1994 | Japan . |

OTHER PUBLICATIONS

Patent Abstract of JP 48055190, First Published Nov. 1973.
Patent Abstract of JP 1–266851, First Published Oct. 1989.

*Primary Examiner*—Thomas Dunn
*Assistant Examiner*—Peter DiMauro
*Attorney, Agent, or Firm*—Oliff & Berridge, PLC

[57] ABSTRACT

A method for purifying an exhaust gas by simultaneously removing carbon monoxide, hydrocarbons, and nitrogen oxides contained in the exhaust gas, comprising bringing the oxygen rich exhaust gas into contact with an exhaust gas purifying catalyst comprised of at least one noble metal selected from the group consisting of platinum and palladium, at least one alkaline earth metal selected from the group consisting of barium, magnesium, calcium, and strontium, and at least one alkali metal selected from the group consisting of iron, nickel, and cobalt, supported on a carrier composed of a porous substance.

9 Claims, No Drawings

METHOD FOR PURIFYING EXHAUST GAS

CROSS-REFERENCE TO RELATED APPLICATION

This is a Continuation of application Ser. No. 08/309,483 filed Sep. 21, 1994, now abandoned, which in turn is a Continuation-In-Part application of U.S. patent application Sep. 9, 1993 now abandoned.

BACKGROUND OF THE INVENTION

1. Field of the Invention

The present invention relates to a method for purifying an exhaust gas, and more specifically, it relates to a method for efficiently purifying the exhaust gas by removing carbon monoxide, hydrocarbons, and nitrogen oxides (NOx) in the exhaust gas.

2. Description of the Related Art

In the past, there have been known as catalysts for purifying automotive exhaust gas many three-way catalysts for purifying exhaust gas which purify exhaust gas by simultaneously oxidizing the carbon monoxide (CO) and hydrocarbons (HC) in the exhaust gas and reducing nitrogen oxides (NOx) in the exhaust gas. Such typical catalysts are comprised of, for example, cordierite or other refractory carriers coated with a γ-alumina slurry, calcined, then made to carry a noble metal such as Pd, Pt, and Rh.

The performance of such an exhaust gas purifying catalyst, however, largely depends upon an air-fuel (A/F) ratio set for the engine. In the case of a lean air-fuel mixture, that is, at the lean side with a large air-fuel ratio, the amount of oxygen in the exhaust gas after combustion increases, and therefore, the oxidation action becomes more active and the reduction action becomes inactive. Conversely, at the rich side with a small air-fuel ratio, the amount of oxygen in the exhaust gas after combustion decreases, and therefore, the oxidation action becomes inactive and the reduction action becomes more active. On the other hand, in recent years, automobiles have been made to be driven at the lean side as much as possible during ordinary driving so as to burn an oxygen rich air-fuel mixture and thereby meet with the demands for lower fuel consumption. A catalyst which can sufficiently remove NOx even at the lean side has therefore been desired.

The present inventors, under these circumstances, proposed as a catalyst for purifying an oxygen rich exhaust gas (i.e., an exhaust gas containing oxygen in an amount exceeding the amount of oxygen necessary for completely oxidizing carbon monoxide, hydrocarbons, hydrogen and other reducible substances contained in the exhaust gas), a catalyst which would adsorb or absorb NOx at the time of an oxygen rich (i.e., lean) atmosphere and would reduce the nitrogen oxides (Nox) at the time of stoichiometric state or rich state and simultaneously perform the oxidation of the carbon monoxide (CO) and hydrocarbons (HC), for example, a Pt/Ba/$Al_2O_3$ catalyst comprised of platinum and barium supported on an alumina carrier (see Japanese Patent Application No. 4-130904). This catalyst, however, did not have a sufficient NOx purification rate after extensive use, even with an increase in the amount of the platinum and barium contents, and therefore, development of a practical exhaust gas purifying catalyst with a high durability has been desired.

As mentioned above, there are cases where a Pt/Ba/alumina catalyst lacks a practically sufficient NOx removal rate after extensive use. This is because the sulfur dioxide ($SO_2$) present in the exhaust gas to be treated, generated by the combustion of S in the fuel, reacts with the Ba and converts it to BaSO4, which does not have the ability to adsorb or absorb NOx, whereupon the NOx removal rate is decreased. This phenomenon becomes marked in particular when performing high temperature durability tests.

SUMMARY OF THE INVENTION

Accordingly, the objects of the present invention are to eliminate the above-mentioned disadvantages of the prior art and to provide a method for purifying an exhaust gas which can maintain a practically acceptable high purification rate even after extensive use at high temperatures.

In accordance with the present invention, there is provided a method for purifying an oxygen rich exhaust gas by simultaneously removing the carbon monoxide, hydrocarbons, and nitrogen oxides contained in the exhaust gas, which comprises:

bringing the exhaust gas into contact with an exhaust gas purifying catalyst comprised of (i) at least one noble metal selected from the group consisting of platinum and palladium (ii) at least one alkaline earth metal selected from the group consisting of barium, magnesium, calcium and strontium, and (iii) at least one metal selected from the group consisting of alkali metals, iron, nickel, and cobalt, supported on a carrier composed of a porous substance, whereby the majority of the nitrogen oxide in the exhaust gas is absorbed into the alkaline earth metal component on the catalyst under an oxygen rich atmosphere and the NOx absorbed into the alkaline earth metal component is released and purified by the reaction with the hydrocarbons and carbon monoxide in the exhaust gas under a stoichiometric air-fuel ratio or fuel rich atmosphere.

DESCRIPTION OF THE PREFERRED EMBODIMENTS

To improve the three-way activity, for the removal of HC, CO, NOx at stoichiometric state, of the catalyst according to the present invention, rhodium may be incorporated into the catalyst, in addition to Pt and/or Pd. The preferable amount of the rhodium supported is 0.05 to 0.5 g/liter of the carrier.

As explained below, according to the method of purifying exhaust gas of the present invention, it is possible to remove, with a high efficiency, the CO, HC, and NOx in the exhaust gas generated from a vehicle etc. Even in a transitory state (i.e., state simulating city driving) and even after extensive use of the catalyst.

The catalyst used in the method of the present invention uses, as active metal components, (i) platinum (Pt) and/or palladium (Pd), (ii) barium (Ba), magnesium (Mg), calcium (Ca) and/or strontium (Sr), and (iii) at least one metal selected from the group consisting of alkali metals (for example, Li, Na, K, Cs, etc.), iron (Fe), nickel (Ni), and cobalt (Co), which are supported on a porous carrier.

The porous carrier usable in the method of the present invention includes, for example alumina, zeolite, zirconia, silica alumina, silica, etc. There is no particular limitation on the type or physical properties of these porous carriers. Use may be made of any porous carrier used for catalysts in the past. Further, these porous carriers may be used coated on a honeycomb body comprised of cordierite, heat resistant metal alloys, etc.

The method for purifying the exhaust gas according to the present invention uses a catalyst comprised of (i) platinum and/or palladium, (ii) barium, magnesium, calcium and/or strontium, and (iii) at least one metal selected from the group consisting of alkali metals, iron, nickel, and cobalt, (hereinafter sometimes referred to as the "third metal component") supported on the above-mentioned porous carrier. Among these metals, the amount of platinum or palladium supported is preferably 0.1 to 10.0 g/liter of the carrier. When platinum and palladium are used together, the total amount is preferably 0.1 to 10.0 g/liter. When the amount of platinum or palladium supported is less than 0.1 g/liter, sometimes there is a case where a sufficient catalytic activity is not obtained. Further, when the amount is more than 10.0 g/liter, even if the amount of the platinum or palladium supported is increased, only grain growth of the platinum or palladium is promoted, and therefore, there is no substantial contribution to the improvement of the catalytic activity, and only the cost becomes higher. It is particularly preferable in terms of the catalytic activity and cost when the amount of the platinum or palladium supported is 0.5 to 3.0 g/liter.

The amount of the alkaline earth metal supported in the catalyst used in the present invention is preferably 0.05 to 10.0 mol/liter of the carrier. When the amount of the alkaline earth metal supported is less than 0.05 mol/liter, sometimes, there is a case where a sufficient NOx removal rate cannot be obtained, while when the amount is more than 10.0 mol/liter, sometimes, there is a case where the surface area of the carrier is reduced. More preferably, the amount supported is 0.15 mol/liter to 1.0 mol/liter.

The amount of the third metal component supported on the catalyst used in the present invention is preferably 0.02 to 10.0 mol/liter of the carrier. When the amount supported is less than 0.02 mol/liter, sometimes there is a case wherein a sufficient NOx removal rate cannot be obtained, while when the amount is more than 10.0 mol/liter, sometimes there is a case where the surface area of the carrier is reduced. More preferably, the amount is 0.05 mol/liter to 1.0 mol/liter.

The method for producing the exhaust gas purifying catalyst used in the present invention is not particularly limited, but it is desirable to produce a catalyst in such a method that Ba, Mg, Ca and/or Sr, an alkali metal such as K at least one metal selected from the group consisting of Fe, Ni, and Co, forms the solid solution or the complex oxide thereof and has a structure wherein the platinum and/or palladium are bonded in a highly dispersed state. For example, a suitable porous carrier is immersed in a slurry containing alumina prepared in accordance with a conventional method so as to coat the carrier with alumina, and thereafter, is dried and calcined at a temperature of, for example, 500 to 700° C., followed by immersing in an aqueous solution of a platinum compound such as dinitrodiammine platinum or tetraammine platinum chloride and/or an aqueous solution of a palladium compound such as palladium nitrate or palladium chloride, and is then dried and calcined at a temperature of, for example, 200 to 500° C., whereby the porous carrier is made to support the platinum and/or palladium thereon. Next, the above-mentioned carrier supporting platinum and/or palladium is immersed in an aqueous mixed solution of an aqueous solution of an alkaline earth metal compound such as barium acetate, calcium nitrate, strontium nitrate or magnesium nitrate and an aqueous solution of a metal compound such as an acetate of iron, nickel, or cobalt, is then dried and calcined at a temperature of, for example, 500 to 700° C. so as to cause the alkaline earth metals, alkali metals, Fe, Ni, and Co, and the platinum and/or palladium to be supported on the carrier in a highly dispersed bonded state.

When purifying the exhaust gas in accordance with the method according to the present invention, the location where the catalyst is placed in the exhaust gas passage of the engine is not particularly limited, but, for example, it is preferable to place it under the floor of the vehicle, directly under the engine, etc. Further, the catalyst according to the present invention may be used in combination with a conventional three-way catalyst.

In the purification method according to the present invention, the space velocity (SV) at which the exhaust gas is introduced into the catalyst layer is not particularly limited, but the use of a range of 300,000 $hr^{-1}$ or less is preferable.

The mechanism by which the method for purifying exhaust gas according to the present invention and the exhaust gas purifying catalyst used for the same exhibit their superior exhaust gas purifying effect is still not necessarily clear, but is believed to be as follows, without prejudice:

According to the present invention, when use is made of a catalyst comprising (i) platinum and/or palladium, (ii) barium, magnesium, calcium and/or strontium and (iii) the above-mentioned third metal component supported on a porous carrier and the catalyst is placed in the exhaust passage of an internal combustion engine, and then, as shown in the following examples as well, it is possible to remove the CO, HC, and NOx at a high efficiency during the driving of a vehicle and further the rate of removal of NOx after a durability test of the catalyst is good as well.

The structure of the catalyst used in the method for purifying exhaust gas according to the present invention may, for example, be (i) platinum and/or palladium, (ii) barium, magnesium, calcium and/or strontium, and (iii) the above-mentioned third metal component supported on the surface of a porous carrier such as alumina in a highly dispersed state. The catalyst of this structure is envisioned as acting as follows in the face of changes in the composition of the engine exhaust gas during driving of a vehicle.

When the atmosphere on the catalyst is an oxidizing atmosphere (lean) (i.e., air (A)/fuel (F) ratio of 14.7 or more), a portion of NOx contained in the exhaust gas is reduced to $N_2$ by HC on the Pt and/or Pd. The majority of the NOx, however, spills over from the Pt and/or Pd and is adsorbed or absorbed in the alkaline earth metal, potassium or other alkali metal, Fe, Ni, Co, and composite products thereof.

When the atmosphere on the catalyst is a state near the stoichiometric air-fuel ratio, for example, 1) when the lean burn engine is in an idling state, 2) during vehicle speed acceleration, or 3) the atmosphere on the catalyst is forcibly made the stoichiometric air-fuel ratio or a fuel rich atmosphere (i.e., A/F ratio of 14.6 or less) or a reducing atmosphere (when adding a reducing agent upstream side of the catalyst), the NOx which had mainly been adsorbed or absorbed on the catalyst by the alkaline earth metal or the third metal component moves on the Pt (i.e., reverse spill over) and reacts with a reducing gas (CO, $H_2$, HC) in the exhaust gas, whereby the NOx is reduced to $N_2$. At this time, the reducing gas is also oxidized and removed. By this mechanism, the NOx is either absorbed or removed by a reducing reaction. This is the characteristic feature of the catalyst used in the present invention.

On the other hand, in the exhaust gas, $SO_2$ is included due to the sulfur present in the fuel. With the alkaline earth metal such as Ba and the compound thereof such as $BaSO_4$ which do not have the ability to absorb NOx are produced by the $SO_2$, $O_2$, and $H_2O$ in the exhaust, and therefore, the long-term durability becomes unsatisfactory. As opposed to this, by restoring (or causing coexistence) of the alkaline earth metal (e.g., Ba) and the above-mentioned third metal component (e.g., K) in the catalyst according to the present invention, sulfate (for example, $K_2Ba(SO_4)_2$ and other complex sulfates) are produced by the reaction with the $SO_2$ in the exhaust gas. These sulfates are broken down or reduced at low temperatures and enter a state of substances active against NOx, such as BaO, $K_2O_2$, $BaK_2O_2$ $Ba(OH)_2$, $BaCO_3$, KOH, SrO, MgO, $Mg(OH)_2$. In this decomposed state, an effect of adsorption or absorption of NOx can be exhibited and the NOx removal rate can be kept high even after the extensive use at a high temperature. According to the present invention, by such a mechanism, it is believed that a long-term NOx absorbing ability is given and a high activity can be maintained. Further, due to this complexing, the particle size of the Ba, Mg, Ca, Sr, K, or the third metal component becomes fine and these are mixed with the Pt in a highly dispersed state. This is considered one of the complexing effects.

EXAMPLES

The present invention will be explained in further detail below in accordance with the Examples, but the present invention is of course not limited to these Examples. In the following Examples, "parts" mean "parts by weight" unless otherwise indicated.

Example 1

Honeycomb catalysts of different amounts of Pt/barium (Ba)/potassium (K)/alumina ($Al_2O_3$) were prepared and the NOx removing activities were evaluated.

a) Preparation of Alumina Slurry

To 100 parts of alumina powder were added 70 parts of alumina sol (alumina content=10% by weight), 15 parts of an aqueous 40% by weight solution of aluminum nitrate, and 30 parts of water. These components were agitated and mixed to prepare the coating slurry.

b) Coating and Calcining

A cordierite honeycomb carrier was immersed in water and then the excess water was blown off. Then, the carrier was immersed in the slurry obtained in the above-mentioned a) and taken out therefrom. After this, the excess slurry was blown off, the carrier was then dried at a temperature of 80° C. for 20 minutes, and at 600° C. for one hour. The coating amount of alumina was 120 g per liter of the honeycomb.

c) Supporting of Pt

The honeycomb obtained in the above-mentioned manner was immersed in an aqueous solution of a predetermined concentration of dinitrodiammine platinum prepared so as to obtain the amount of Pt supported shown in Table 1. This was dried at 250° C. to prepare the catalyst with the amount of Pt supported, shown in Table 1.

d) The above-mentioned carrier supporting platinum thereon was immersed in an aqueous mixed solution of an aqueous solution of barium acetate and an aqueous solution of potassium acetate of predetermined concentrations prepared so as to give the amounts of Ba and K supported shown in Table 1. This was dried, then calcined at 600° C. for one hour to obtain the catalyst according to the present invention of, i.e., Catalyst Nos. 1 to 4 of Table 1.

As a Comparative catalyst, the catalyst of No. 5 not supporting potassium was also prepared by the method according to the preparation method of the catalyst of the present invention.

TABLE 1

Catalyst Prepared

| Catalyst No. | Amount supported | | |
|---|---|---|---|
| | K (mol/liter) | Ba (mol/liter) | Pt (g/liter) |
| 1 | 0.01 | 0.1 | 2.0 |
| 2 | 0.1 | 0.1 | 2.0 |
| 3 | 0.1 | 0.2 | 2.0 |
| 4 | 0.2 | 0.2 | 2.0 |
| 5 | 0 | 1.0 | 2.0 |

Evaluation

The purification efficiencies of the above-mentioned catalysts were evaluated under the following conditions (evaluation of emission).

Each of the above-mentioned catalysts was placed in the exhaust gas passage of a vehicle provided with a lean burn engine (1.6 liter). The vehicle was run in the 10.15 mode to measure the NOx removal efficiency. The results are shown in Table 2.

In the durability test, the above-mentioned catalyst was placed in the exhaust passage of a lean burn engine (1.6 liter). The engine was operated at an A/F of 18 and an inlet gas temperature of 650° C. for 50 hours.

TABLE 2

Results of Evaluation

| Catalyst No. | Removal rate of initial product (%) NOx | Removal efficiency of durability test product (%) NOx |
|---|---|---|
| 1 | 92 | 35 |
| 2 | 92 | 55 |
| 3 | 93 | 60 |
| 4 | 93 | 66 |
| 5 | 93 | 53 |

Except for using an aqueous solution of palladium nitrate instead of the aqueous solution of dinitrodiamine platinum, a honeycomb catalyst of $Pd/Ba/K/Al_2O_3$ was prepared in the same way as the honeycomb catalyst of $Pt/Ba/K/Al_2O_3$ of Example 1. The NOx removal activity was evaluated. The amounts of the components supported and the results are shown in Table 3.

TABLE 3

Results of Evaluation

| Catalyst No. | Amount suppr oted | | | NOx removal efficiency (%) | |
|---|---|---|---|---|---|
| | K[1] | Ba[1] | Pd[2] | Initial product | Durability test product |
| 1 | 0.01 | 0.1 | 2.0 | 90 | 36 |
| 2 | 0.1 | 0.1 | 2.0 | 92 | 53 |
| 3 | 0.1 | 0.2 | 2.0 | 91 | 51 |
| 4 | 0.2 | 0.2 | 2.0 | 92 | 60 |
| 5 | 0.0 | 1.0 | 2.0 | 92 | 48 |

[1] mol/liter
[2] g/liter

Example 3

Honeycomb catalysts of different amounts of Pt/barium/nickel/alumina were prepared and the NOx removal activities were evaluated.

a) Preparation of Alumina Slurry

To 100 parts of alumina powder were added 70 parts of alumina sol (10% by weight content of alumina), 15 parts of a 40% by weight aqueous solution of aluminum nitrate, and 30 parts of water. These components were agitated and mixed to prepare the coating slurry.

b) Coating and Calcining

A cordierite honeycomb carrier was immersed in water and then the excess water was blown off. Then, the carrier was immersed in the slurry obtained in the above-mentioned a) and taken out therefrom. Thereafter, the excess slurry was blown off, the carrier then was dried at a temperature of 80° C. for 20 minutes, and at 600° C. for one hour. The coating amount of alumina was 120g per liter of the honeycomb.

c) Supporting of Pt

The honeycomb obtained in the above-mentioned manner was immersed in an aqueous solution of a predetermined concentration of dinitrodiammine platinum prepared to obtain the amount of Pt supported shown in Table 4. This was dried at 250° C. to prepare the catalyst with the amount of Pt supported shown in Table 4.

d) The above-mentioned carrier supporting platinum was immersed in an aqueous mixed solution of an aqueous solution of barium acetate and an aqueous solution of nickel acetate of predetermined concentrations prepared so as to give the amounts of Ba and Ni supported shown in Table 4. This was dried, then calcined at 600° C. for one hour to obtain the catalyst of the Catalyst Nos. 1 to 4 according to the present invention, shown in Table 4.

As a Comparative catalyst, the catalyst No. 5 was prepared at the same time in the same method according to the preparation of the catalyst of the present invention.

TABLE 4

| | Catalyst Prepared | | |
| --- | --- | --- | --- |
| | Amount supported | | |
| Catalyst No. | Ni (mol/liter) | Ba (mol/liter) | Pt (g/liter) |
| 1 | 0.01 | 0.1 | 2.0 |
| 2 | 0.1 | 0.1 | 2.0 |
| 3 | 0.1 | 0.2 | 2.0 |
| 4 | 0.2 | 0.2 | 2.0 |
| 5 | 0 | 1.0 | 2.0 |

Evaluation

The purification efficiencies of the above-mentioned catalysts were evaluated under the following conditions (evaluation of emission).

Each of the above-mentioned catalyst was placed in the exhaust gas passage of a vehicle provided with a lean burn engine (1.6 liter). This was run in the 10.15 mode to measure the removal efficiency of NOx. The results are shown in Table 5.

For the used catalyst, the above-mentioned catalyst was placed in the exhaust gas passage of a lean burn engine (1.6 liter). The engine was operated at an A/F of 18 and an inlet gas temperature of 650° C. for 50 hours.

TABLE 5

| | Results of Evaluation | |
| --- | --- | --- |
| Catalyst No. | Purification rate of initial product (%) NOx | Purification rate of durability test product (%) NOx |
| 1 | 92 | 30 |
| 2 | 92 | 55 |
| 3 | 93 | 57 |
| 4 | 93 | 63 |
| 5 | 93 | 53 |

Example 4

Honeycomb catalysts of different amounts of Pt/Ba/Cs/$Al_2O_3$ were prepared in the same manner as in Example 1 and the NOx removal activities were evaluated in the same manner as in Example 1. The amounts of the components supported and the results are shown in Table 6.

TABLE 6

| Catalyst | Amount supported | | | NOx removal efficiency (%) | |
| --- | --- | --- | --- | --- | --- |
| | | | | | Durability |
| | | | | Initial | test |
| No. | Cs[*1] | Ba[*1] | Pt[*2] | product | product |
| 1 | 0.01 | 0.1 | 2.0 | 93 | 35 |
| 2 | 0.1 | 0.1 | 2.0 | 92 | 57 |
| 3 | 0.1 | 0.2 | 2.0 | 94 | 60 |
| 4 | 0.2 | 0.2 | 2.0 | 94 | 68 |
| 5 | 10.0 | 0.1 | 2.0 | 72 | 21 |
| 6 | 11.0 | 0.1 | 2.0 | 52 | 19 |

[*1]: mol/liter
[*2]: g/liter

Example 5

Honeycomb catalysts of different amounts of Pt/Ba/Li/$Al_2O_3$ were prepared in the same manner as in Example 1 and the NOx removal activities were evaluated in the same manner as in Example 1. The amounts of the components supported and the results are shown in Table 7.

TABLE 7

| Catalyst | Amount supported | | | NOx removal efficiency (%) | |
| --- | --- | --- | --- | --- | --- |
| | | | | | Durability |
| | | | | Initial | test |
| No. | Li[*1] | Ba[*1] | Pt[*2] | product | product |
| 1 | 0.01 | 0.1 | 2.0 | 91 | 28 |
| 2 | 0.1 | 0.1 | 2.0 | 93 | 59 |
| 3 | 0.1 | 0.2 | 2.0 | 93 | 64 |
| 4 | 0.2 | 0.2 | 2.0 | 94 | 66 |
| 5 | 10.0 | 0.1 | 2.0 | 79 | 23 |
| 6 | 11.0 | 0.1 | 2.0 | 61 | 21 |

[*1]: mol/liter
[*2]: g/liter

Example 6

Honeycomb catalysts of different amounts of Pt/Ba/Na/$Al_2O_3$ were prepared in the same manner as in Example 1 and the NOx removal activities were evaluated in the same manner as in Example 1. The amounts of the components supported and the results are shown in Table 8.

TABLE 8

| Catalyst No. | Amount supported | | | NOx removal efficiency (%) | |
|---|---|---|---|---|---|
| | Na*1 | Ba*1 | Pt*2 | Initial product | Durability test product |
| 1 | 0.01 | 0.1 | 2.0 | 92 | 58 |
| 2 | 0.1 | 0.2 | 2.0 | 92 | 55 |
| 3 | 0.2 | 0.2 | 2.0 | 93 | 64 |

*1: mol/liter
*2: g/liter

Example 7

Honeycomb catalysts of different amounts of Pt/Ba/Fe/Al$_2$O$_3$ were prepared in the same manner as in Example 1 and the NOx removal activities were evaluated in the same manner as in Example 1. The amounts of the components supported and the results are shown in Table 9.

TABLE 9

| Catalyst No. | Amount supported | | | NOx removal efficiency (%) | |
|---|---|---|---|---|---|
| | Fe*1 | Ba*1 | Pt*2 | Initial product | Durability test product |
| 1 | 0.1 | 0.1 | 2.0 | 90 | 57 |
| 2 | 0.1 | 0.2 | 2.0 | 92 | 55 |
| 3 | 0.2 | 0.2 | 2.0 | 91 | 62 |

*1: mol/liter
*2: g/liter

Example 8

Honeycomb catalysts of different amounts of Pt/Ba/Co/Al$_2$O$_3$ were prepared in the same manner as in Example 1 and the NOx removal activities were evaluated in the same manner as in Example 1. The amounts of the components supported and the results are shown in Table 10.

TABLE 10

| Catalyst No. | Amount supported | | | NOx removal efficiency (%) | |
|---|---|---|---|---|---|
| | Co*1 | Ba*1 | Pt*2 | Initial product | Durability test product |
| 1 | 0.1 | 0.1 | 2.0 | 92 | 56 |
| 2 | 0.1 | 0.2 | 2.0 | 92 | 55 |
| 3 | 0.2 | 0.2 | 2.0 | 93 | 64 |

*1: mol/liter
*2: g/liter

From the above-mentioned results, it is clear that with the method for purifying exhaust gas according to the present invention, there is little deterioration in the removal of the NOx exhausted from a vehicle provided with a lean burn engine, even after use and so the exhaust gas can be efficiently purified. In particular, the amount of the Ba supported is preferably 0.15 to 1.0 mol/liter, the amount of the K or Ni or other third metal component supported is 0.05 to 1.0 mol/liter, and the amount of the platinum and/or palladium supported is 0.5 to 7.0 g/liter.

Example 9

Honeycomb catalysts of different amounts of Pt/Ba/Mg/Al$_2$O$_3$ were prepared in the same manner as in Example 1 and the NOx removal activities were evaluated in the same manner as in Example 1. The amounts of the components supported and the results are shown in Table 11.

TABLE 11

| Catalyst No. | Amount supported | | | | NOx removal efficiency (%) | |
|---|---|---|---|---|---|---|
| | Mg*1 | Ba*1 | Pt*2 | Rh*2 | Initial product | Durability test product |
| 1 | 0.1 | 0.1 | 2.0 | — | 90 | 34 |
| 2 | 0.1 | 0.1 | 2.0 | — | 94 | 58 |
| 3 | 0.1 | 0.2 | 2.0 | — | 95 | 62 |
| 4 | 0.2 | 0.2 | 2.0 | — | 95 | 69 |
| 5 | 10.0 | 0.1 | 2.0 | — | 73 | 24 |
| 6 | 11.0 | 0.1 | 2.0 | 0.1*3 | 58 | 19 |

*1: mol/liter
*2: g/liter
*3: Carried from aqueous solution of rhodium nitrate

Example 10

Honeycomb catalysts of different amounts of Pt/Ba/Mg/Al$_2$O$_3$ were prepared in the same manner as in Example 1 and the NOx removal activities were evaluated in the same manner as in Example 1. The amounts of the components supported and the results are shown in Table 12.

TABLE 12

| Catalyst No. | Amount supported | | | | NOx removal efficiency (%) | |
|---|---|---|---|---|---|---|
| | Mg*1 | Ba*1 | Pt*2 | Rh*2 | Initial product | Durability test product |
| 1 | 0.01 | 0.1 | 2.0 | — | 90 | 32 |
| 2 | 0.1 | 0.1 | 2.0 | — | 92 | 53 |
| 3 | 0.1 | 0.2 | 2.0 | — | 92 | 51 |
| 4 | 0.2 | 0.2 | 2.0 | — | 90 | 62 |
| 5 | 0.0 | 1.0 | 2.0 | 0.1*3 | 92 | 46 |

*1: mol/liter
*2: g/liter
*3: Carried from aqueous solution of rhodium nitrate

In actual operation, cars are repeatedly accelerated and decelerated. To handle the exhaust gas produced under these circumstances, according to the present invention, the electron state of the Pt and/or Pd is controlled by the barium, the alkali metals, or the third metal component such as iron, nickel, cobalt, or magnesium, whereby it is possible to improve the reactivity with the HC and NOx and further it is possible to use the NO adsorbing characteristic of barium, potassium and other alkali metals, Fe, Ni, Co, or Mg to greatly improve the NOx removal efficiency at acceleration and deceleration. Therefore, it is clear that the CO and HC in oxygen rich exhaust gas can be sufficiently removed, and therefore, the nitrogen oxides in the same exhaust gas can be efficiently removed.

Example 11

Various honeycomb catalysts having the compositions shown in Table 13 were evaluated in the same manner as in Example 1. The results are shown in Table 14.

TABLE 13

| Catalyst No. | Mg*1 | Ca*1 | Sr*1 | Li*1 | Na*1 | K*1 | Fe*1 | Ni*1 | Co*1 | Pt*2 |
|---|---|---|---|---|---|---|---|---|---|---|
| 1 | 0.1 | — | — | 0.1 | — | — | — | — | — | 2.0 |
| 2 | 0.2 | — | — | — | 0.1 | — | — | — | — | 2.0 |
| 3 | 0.2 | — | — | — | — | 0.1 | — | — | — | 2.0 |
| 4 | 0.2 | — | — | — | — | — | — | — | — | 2.0 |
| 5 | — | 0.1 | — | 0.1 | — | — | — | — | — | 2.0 |
| 6 | — | 0.2 | — | — | 0.1 | — | — | — | — | 2.0 |
| 7 | — | 0.2 | — | — | — | 0.1 | — | — | — | 2.0 |
| 8 | — | 0.2 | — | — | — | — | — | — | — | 2.0 |
| 9 | — | — | 0.1 | 0.1 | — | — | — | — | — | 2.0 |
| 10 | — | — | 0.2 | — | 0.1 | — | — | — | — | 2.0 |
| 11 | — | — | 0.2 | — | — | 0.1 | — | — | — | 2.0 |
| 12 | — | — | — | — | — | — | — | — | — | 2.0 |
| 13 | 0.1 | — | — | — | — | — | 0.1 | — | — | 2.0 |
| 14 | 0.2 | — | — | — | — | — | — | 0.1 | — | 2.0 |
| 15 | 0.2 | — | — | — | — | — | — | — | 0.1 | 2.0 |
| 16 | — | 0.1 | — | — | — | — | 0.1 | — | — | 2.0 |
| 17 | — | 0.2 | — | — | — | — | — | 0.1 | — | 2.0 |
| 18 | — | 0.2 | — | — | — | — | — | — | 0.1 | 2.0 |
| 19 | — | — | 0.1 | — | — | — | 0.1 | — | — | 2.0 |
| 20 | — | — | 0.2 | — | — | — | — | 0.1 | — | 2.0 |
| 21 | — | — | 0.2 | — | — | — | — | — | 0.1 | 2.0 |

*1 mol/liter
*2 g/liter

TABLE 14

| Catalyst No. | NOx removal efficiency (%) Initial Product | NOx removal efficiency (%) Durability test product |
|---|---|---|
| 1 | 85 | 44 |
| 2 | 91 | 48 |
| 3 | 92 | 49 |
| 4 | 82 | 30 |
| 5 | 91 | 46 |
| 6 | 92 | 50 |
| 7 | 92 | 52 |
| 8 | 88 | 35 |
| 9 | 89 | 48 |
| 10 | 92 | 51 |
| 11 | 93 | 53 |
| 12 | 87 | 38 |
| 13 | 78 | 40 |
| 14 | 80 | 45 |
| 15 | 82 | 46 |
| 16 | 89 | 48 |
| 17 | 90 | 53 |
| 18 | 90 | 50 |
| 19 | 87 | 46 |
| 20 | 88 | 53 |
| 21 | 89 | 51 |

We claim:

1. A method for purifying an exhaust gas from a lean burn engine comprising sulfur oxides, carbon monoxide, hydrocarbons, and nitrogen oxides, said method comprising:

simultaneously removing said carbon monoxide, hydrocarbons, and nitrogen oxides by bringing the exhaust gas from the lean burn engine operated at an air-fuel ratio of 18 or more into contact with an exhaust gas purifying catalyst comprising (i) at least one noble metal selected from the group consisting of platinum and palladium, (ii) at least one alkaline earth metal selected from the group consisting of barium, magnesium, calcium and strontium. and (iii) at least one metal selected from the group consisting of elements of alkali metals, supported on a carrier composed of a porous substance, absorbing a majority of the nitrogen oxides in the exhaust gas onto the alkaline earth metal component on the porous support, under an oxygen rich atmosphere, in which oxidizing concentrations are above a stoichiometric point that is required for oxidizing components to be oxidized in the exhaust gas, changing said exhaust gas from oxygen-rich to fuel-rich, reducing, releasing and purifying said adsorbed nitrogen oxides by reacting said absorbed nitrogen oxides with said hydrocarbons and carbon monoxide in the exhaust gas under a stoichiometric atmosphere or a fuel-rich atmosphere, in which oxygen concentrations are below the stoichiometric point, reacting the sulfur oxides with both said alkaline earth metal and said metal to form complex sulfates composed of sulfates of both said alkaline earth metal and said metal that decompose at temperatures sufficiently low to avoid poisoning the catalyst, and decomposing the complex sulfates.

2. A method as claimed in claim 1, wherein said carrier is selected from the group consisting of alumina, zeolite, zirconia, silica alumina, and silica.

3. The method as claimed in claim 1, wherein the amount of the noble metal supported is 0.1 to 10.0 g/liter of the carrier.

4. The method as claimed in claim 1, wherein the amount of the alkaline earth metal supported is 0.05 to 10.0 mol/liter of the carrier.

5. The method as claimed in claim 1, wherein the amount of the alkaline metal supported is 0.02 to 10.0 mol/liter of the carrier.

6. The method as claimed in claim 1, wherein said catalyst further comprises rhodium.

7. The method as claimed in claim 6, wherein the amount supported of the rhodium is 0.05 to 0.5 g/liter of the catalyst.

8. A method as claimed in claim 1, wherein the molar ratio of said at least one alkaline earth metal to said at least one metal is at least 1.

9. A method as claimed in claim 1, wherein the exhaust gas purifying catalyst consists essentially of (i) at least one noble metal selected from the group consisting of platinum and palladium, (ii) at least one alkaline earth metal selected from the group consisting of barium, magnesium, calcium and strontium, and (iii) at least one metal selected from the group consisting of elements of alkali metals, supported on a carrier composed of a porous substance.

* * * * *